United States Patent
Honda et al.

(10) Patent No.: US 8,076,027 B2
(45) Date of Patent: Dec. 13, 2011

(54) NEGATIVE ELECTRODE FOR LITHIUM SECONDARY BATTERY, LITHIUM SECONDARY BATTERY USING SAME, AND METHODS FOR MANUFACTURING THOSE

(75) Inventors: Kazuyoshi Honda, Osaka (JP); Yuuko Ogawa, Osaka (JP); Yasutaka Kogetsu, Osaka (JP)

(73) Assignee: Panasonic Corporation, Osaka (JP)

( * ) Notice: Subject to any disclaimer, the term of this patent is extended or adjusted under 35 U.S.C. 154(b) by 1173 days.

(21) Appl. No.: 11/814,694

(22) PCT Filed: Jan. 23, 2006

(86) PCT No.: PCT/JP2006/300931
§ 371 (c)(1),
(2), (4) Date: Jul. 25, 2007

(87) PCT Pub. No.: WO2006/080265
PCT Pub. Date: Aug. 3, 2006

(65) Prior Publication Data
US 2009/0017380 A1    Jan. 15, 2009

(30) Foreign Application Priority Data
Jan. 26, 2005   (JP) ................................. 2005-018054

(51) Int. Cl.
*H01M 4/58* (2010.01)
(52) U.S. Cl. ..................... 429/218.1; 429/233; 429/245; 429/246; 429/235; 429/231.95; 29/623.5; 427/248.1
(58) Field of Classification Search .................. 429/218, 429/233, 245, 218.1, 246, 235, 231.95; 204/192.1; 427/248.1; 29/623.5
See application file for complete search history.

(56) References Cited

U.S. PATENT DOCUMENTS

| | | | |
|---|---|---|---|
| 5,554,460 A | 9/1996 | Wu et al. | |
| 6,180,281 B1 | 1/2001 | Schneider et al. | |
| 6,261,722 B1 * | 7/2001 | Dasgupta et al. | 429/304 |
| 6,332,900 B1 * | 12/2001 | Muffoletto et al. | 29/623.5 |
| 6,605,386 B1 * | 8/2003 | Kasamatsu et al. | 429/218.1 |
| 6,641,863 B2 * | 11/2003 | Kugai et al. | 427/126.1 |

(Continued)

FOREIGN PATENT DOCUMENTS

JP      62-246270 A     10/1987

(Continued)

OTHER PUBLICATIONS

Schoonman et al. "The film solid electrolytes and electrodes for rechargeable lithium-ion batteries" J. of Power Sources, 1997, 65-68.*

(Continued)

*Primary Examiner* — Patrick Ryan
*Assistant Examiner* — Alex Usyatinsky
(74) *Attorney, Agent, or Firm* — RatnerPrestia

(57) ABSTRACT

A negative electrode for a secondary battery includes a separator; a negative electrode active material layer which is fixed to the separator and can store and emit lithium ions; and a current collector layer formed on the side of the separator opposite to the negative electrode active material layer. The negative electrode active material layer contains at least one selected from the group consisting of silicon, silicon alloys, compounds containing silicon and oxygen, compounds containing silicon and nitrogen, compounds containing silicon and fluorine, tin, tin alloys, compounds containing tin and oxygen, compounds containing tin and nitrogen, and compounds containing tin and fluorine.

16 Claims, 4 Drawing Sheets

U.S. PATENT DOCUMENTS

| | | | |
|---|---|---|---|
| 7,416,815 B2 * | 8/2008 | Ota et al. | 429/231.95 |
| 2002/0036131 A1 * | 3/2002 | Kugai et al. | 204/192.1 |
| 2004/0109940 A1 * | 6/2004 | Kugai et al. | 427/58 |
| 2005/0053833 A1 * | 3/2005 | Hayashida et al. | 429/209 |
| 2005/0074671 A1 * | 4/2005 | Sugiyama et al. | 429/231.95 |

FOREIGN PATENT DOCUMENTS

| | | | |
|---|---|---|---|
| JP | 04-051474 A | | 2/1992 |
| JP | 07-326345 A | | 12/1995 |
| JP | 11-233116 | * | 2/1998 |
| JP | 11-233116 A | | 8/1999 |
| JP | 2000-173583 A | | 6/2000 |
| JP | 2001-006677 A | | 1/2001 |
| JP | 2002-083594 A | | 3/2002 |
| JP | 2002-260637 A | | 9/2002 |
| JP | 2003-243038 A | | 8/2003 |
| JP | 2004-127561 | * | 4/2004 |
| JP | 2004-127561 A | | 4/2004 |

OTHER PUBLICATIONS

International Search Report for Application No. PCT/JP2006/300931, dated Apr. 25, 2006.

* cited by examiner

NEGATIVE ELECTRODE FOR LITHIUM SECONDARY BATTERY, LITHIUM SECONDARY BATTERY USING SAME, AND METHODS FOR MANUFACTURING THOSE

This application is a U.S. National Phase Application of PCT International Application PCT/JP2006/300931.

TECHNICAL FIELD

The present invention relates to a negative electrode for a lithium secondary battery and a method for manufacturing the negative electrode. The present invention also relates to a lithium secondary battery using the negative electrode, and a method for manufacturing the lithium secondary battery.

BACKGROUND ART

In recent years, as a negative electrode active material for a non-aqueous electrolyte secondary battery, negative electrode materials containing an element capable of storing and emitting lithium ions reversibly and electrochemically such as Si (silicon) or Sn (tin) have been drawing attention. Using such a metallic element as a negative electrode active material may achieve a larger negative electrode capacity than using carbon materials such as graphite, which are typical conventional negative electrode active materials. Silicon, for example, has a theoretical discharge capacity of about 4199 mAh/g, which is about 11 times larger than that of graphite.

These negative electrode materials, however, tend to be greatly expanded as a result that these negative electrode materials form an alloy with lithium (Li) and change their structure when storing lithium ions. In a case where graphite is used as a negative electrode active material, lithium ions are intercalated into the interlayers of graphite. This intercalation reaction reduces the volume expansion caused by the storage of lithium ions to about 1.1 times. In contrast, if Si stores lithium ions to its maximum capacity, the negative electrode active material is theoretically expanded about 4 times more than before the storage. When the negative electrode active material is greatly expanded due to the storage of lithium ions in this manner, the active material particles may be broken or the active material layer may be peeled off from the current collector layer, thereby decreasing the conductivity in the negative electrode. The decrease in the conductivity of the negative electrode leads to a decrease in battery characteristics such as charge-discharge cycle characteristics.

The peeling off of the active material layer can be prevented, for example, by increasing the proportion of a binder in the active material layer. However, this may decrease the negative electrode capacity because the binder does not contribute to charge-discharge reactions.

Under such circumstances, various techniques have been proposed in order to reduce the destruction of the active material layer or a decrease in conductivity due to the expansion of the active material in a negative electrode that uses a high-capacity material such as Si as an active material, which stores lithium ions.

For example, Japanese Patent Unexamined Publication No. 2002-260637 discloses a negative electrode which is formed by sintering a mixture of Si-containing active material particles and conductive metal powder on the surface of a current collector in a non-oxidizing atmosphere. The current collector is composed of a metal foil or a conductive metal powder which are made of copper or a copper alloy.

In this negative electrode, however, the sintering process of manufacturing causes the generation of a Cu—Si compound which does not electrochemically react with Li, thereby decreasing the negative electrode capacity. Furthermore, the sintering is required to be performed at high temperatures, making it likely that the copper used in the current collector is melted or hardened. Such phenomena may destroy the flexibility of the current collector, thereby interfering with the formation of the electrode assembly.

Japanese Patent Unexamined Publication No. 2004-127561, on the other hand, discloses a negative electrode including a current collector and a thin film formed thereon. The current collector is made of a material that does not form an alloy with Li, and the thin film is made of a metal that forms an alloy with Li or of an alloy containing the metal. In this negative electrode, a negative electrode active material layer having protrusions and depressions is formed selectively in a predetermined pattern on the current collector by photoresist, plating, and the like. The protrusions of the negative electrode active material are columnar and surrounded by spaces that absorb the volume expansion and avoid the destruction of the negative electrode active material. This patent publication further discloses a secondary battery using the negative electrode which includes a current collector and a negative electrode active material layer formed in a pattern having protrusions and depressions on the current collector. The negative electrode active material layer is faced with a positive electrode via a separator interposed therebetween in the same manner as in the conventional batteries.

However, the manufacturing method of a negative electrode thus structured requires the formation of a photoresist mask used to pattern the negative electrode active material layer. This complicated pretreatment leads to a reduction in productivity.

Moreover, the current collector is required to have strength sufficient to be handled in these manufacturing processes. Therefore, the current collector should have a thickness over several micrometers corresponding to 50% or more of the thickness of the negative electrode active material layer, which decreases the volumetric efficiency or packing efficiency in the battery. As it gets thicker, the current collector becomes less flexible. Therefore, when the negative electrode active material layer is repeatedly expanded and contracted during charge and discharge, the negative electrode active material and the current collector are likely to be peeled off from each other. As a result, the current collector becomes hard to hold the negative electrode, thereby reducing current collection performance.

SUMMARY OF THE INVENTION

The negative electrode for a secondary battery of the present invention includes: a separator; a negative electrode active material layer which is fixed to the separator and stores and emits lithium ions; and a current collector layer formed on the side of the separator opposite to the negative electrode active material layer. The negative electrode active material layer contains at least one selected from the group consisting of silicon, silicon alloys, compounds containing silicon and oxygen, compounds containing silicon and nitrogen, compounds containing silicon and fluorine, tin, tin alloys, compounds containing tin and oxygen, compounds containing tin and nitrogen, and compounds containing tin and fluorine. In this structure, the negative electrode active material is fixed to the separator by forming the negative electrode active material layer having a high capacity density directly on the separator. As a result, the negative electrode active material layer and the separator can be treated as one unit. In addition, the formation of the current collector layer on the negative electrode active material layer eliminates the need to handle the current collector solely, thereby allowing the thickness of the current collector to be as small as several micrometers or less. This prevents a significant reduction in the volumetric efficiency or packing efficiency in the battery. Furthermore, in the negative electrode thus integrated with the separator, the negative electrode current collector is thin enough to keep its flexibility.

The method for manufacturing a negative electrode for a secondary battery of the present invention includes a step of forming a negative electrode active material layer on a separator by a gas-phase process, and a step of forming a current collector layer on the negative electrode active material layer by a gas-phase process. The aforementioned negative electrode for a secondary battery can be obtained with this manufacturing method.

The secondary battery of the present invention includes: a negative electrode which has a negative electrode active material layer made of one of the aforementioned materials; a positive electrode which is disposed oppositely to the negative electrode via a separator interposed therebetween and stores and emits lithium ions; and an electrolyte which is at least contained in the separator so as to conduct lithium ions. This structure achieves a secondary battery that has a high cell performance due to a negative electrode active material with a high capacity density and that has improved durability against charge-discharge cycles.

The method for manufacturing a secondary battery of the present invention includes the aforementioned two steps of manufacturing the negative electrode, a step of forming a positive electrode storing and emitting lithium ions on the side of the separator opposite to the negative electrode active material layer, and a step of at least impregnating the separator with a lithium-ion conductive electrolyte solution. The aforementioned secondary battery can be obtained by this manufacturing method.

DETAILED DESCRIPTION OF PREFERRED EMBODIMENTS

Figure 1:
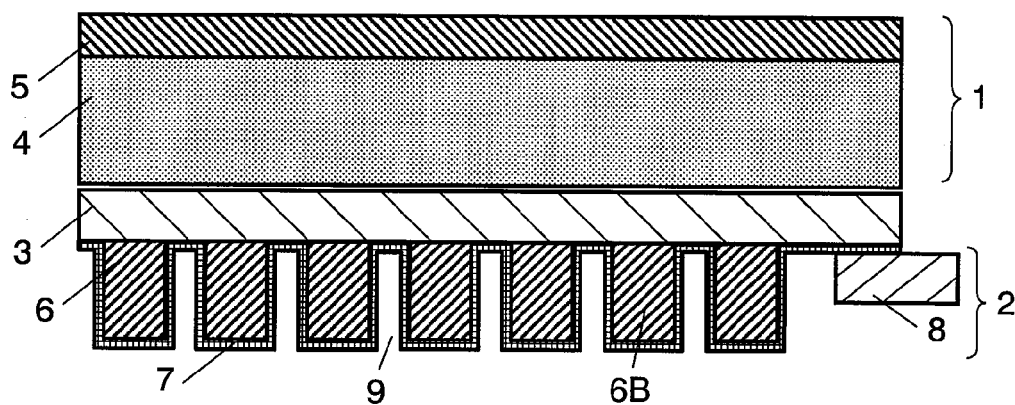
FIG. 1 is a schematic sectional view showing a structure of a secondary battery according to a first exemplary embodiment of the present invention.

The preferred embodiments of the present invention are described as follows with reference to drawings. In each embodiment, similar components are labeled with same reference numerals with respect to previous embodiments, and the description of these components may not be repeated.

First Exemplary Embodiment

FIG. 1 is a schematic sectional view showing a structure of a secondary battery according to a first exemplary embodiment of the present invention. The secondary battery has positive electrode 1, negative electrode 2, and separator 3 which is made of a microporous film with micropores and interposed between positive electrode 1 and negative electrode 2. Positive electrode 1 includes positive electrode active material layer 4 and positive electrode current collector 5. Negative electrode 2, which is formed on separator 3, includes negative electrode active material layer 6 fixed on separator 3, metallic current collector layer 7 as a current collector layer formed on negative electrode active material layer 6, and drawing electrode 8. In negative electrode active material layer 6, a plurality of columns with grooves 9 formed therebetween are provided on separator 3.

Separator 3 contains a lithium-ion conductive electrolyte. In other words, the electrolyte is impregnated at least in separator 3. Negative electrode active material layer 6 fixed on separator 3 contains at least one selected from the group consisting of elemental substance of silicon, silicon alloys, compounds containing silicon and oxygen, compounds containing silicon and nitrogen, compounds containing silicon and fluorine, elemental substance of tin, tin alloys, compounds containing tin and oxygen, compounds containing tin and nitrogen, and compounds containing tin and fluorine. Positive electrode active material layer 4 contains a compound capable of storing and emitting lithium ions.

In the present invention, the expression "negative electrode active material layer 6 is fixed to separator 3" means that negative electrode active material layer 6 and separator 3 do not move in relative position as a result of being fixed to each other by the intermolecular force between their constituent materials or by the contact between their rough surfaces.

The following is a description of a method for manufacturing negative electrode 2 and a method for manufacturing a secondary battery using negative electrode 2 according to the present exemplary embodiment. The method for manufacturing the secondary battery according to the present exemplary embodiment includes the following four steps A to D.

A) forming negative electrode active material layer 6 on separator 3 by a gas-phase process;

B) forming metallic current collector layer 7 on negative electrode active material layer 6 by a gas-phase process;

C) providing positive electrode 1 capable of storing and emitting lithium ions on the side of separator 3 opposite to negative electrode active material layer 6; and D) impregnating at least the micropores of separator 3 with a lithium-ion conductive electrolyte.

Figure 2A:
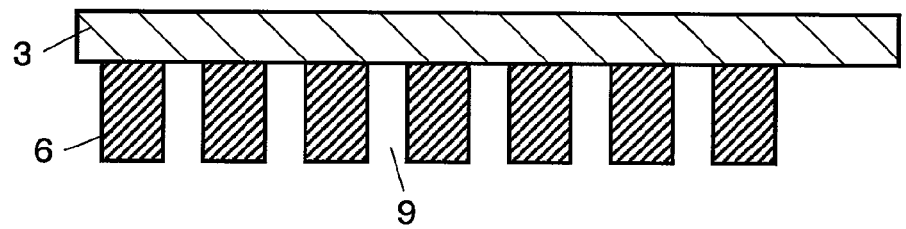
FIG. 2A is a schematic sectional view showing a step of a method for manufacturing the negative electrode shown in FIG. 1.
Figure 2B:
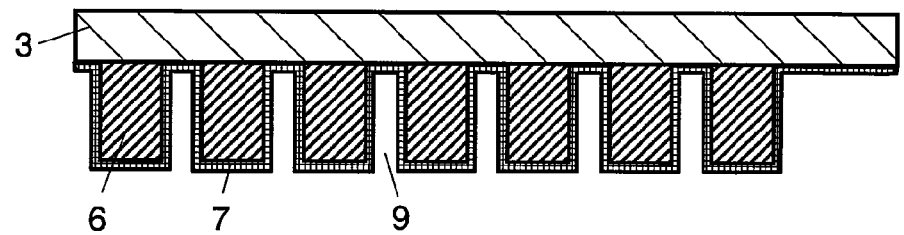
FIG. 2B is a schematic sectional view showing a step following the step of FIG. 2A.
Figure 2C:
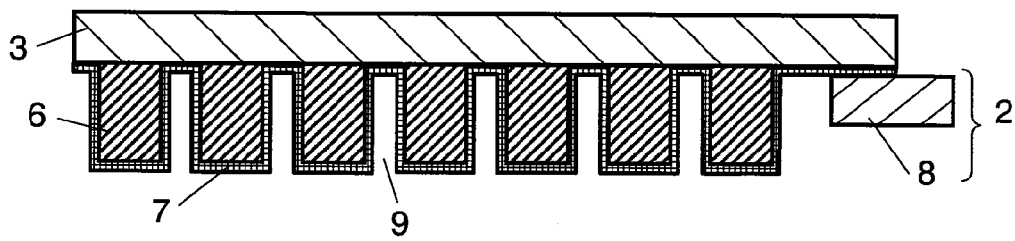
FIG. 2C is a schematic sectional view showing a step following the step of FIG. 2B.

FIGS. 2A to 2C show steps of the method for manufacturing negative electrode 2 of the non-aqueous electrolyte secondary battery of the present exemplary embodiment. FIG.

2A is a schematic sectional view showing a state in which negative electrode active material layer 6 is formed on separator 3. FIG. 2B is a schematic sectional view showing a state in which metallic current collector layer 7 is formed on negative electrode active material layer 6 of FIG. 2A. FIG. 2C is a schematic sectional view showing a state in which drawing electrode 8 is formed on negative electrode 2 of FIG. 2B.

As shown in FIG. 2A, a thin film of negative electrode active material layer 6 is fixed on separator 3. In the same manner as in general secondary batteries, separator 3 is required to have electrolyte resistance, electrochemical oxidation resistance, and sufficient porosity to provide an optimum permeability for the lithium ions in the electrolyte. Separator 3 used in the present invention is further required to ensure negative electrode active material layer 6 to be fixed on its surface. More specifically, negative electrode active material layer 6 should be fixed on the surface of separator 3 without damaging the micropore structure or strength of separator 3 by the heat generated during a thin film forming process such as a gas-phase process. The heat load generated during the formation of the thin film of negative electrode active material layer 6 changes depending on the thin film deposition rate or the distance between the film deposition source and the separator. Therefore, it is effective that the separator is cooled as necessary or made of a material resistant to high temperatures of 200° C. or higher in order to prevent the damage of the micropore structure and strength of separator 3. Thus, separator 3 is preferably provided with a heat resistance layer resistant to temperatures of 200° C. or higher.

Separator 3 is provided thereon with materials for negative electrode active material layer 6 and metallic current collector layer 7 each having electronic conductivity by the thin film forming processes. If these electronically conductive materials enter the micropores of separator 3 and deposit on the wall in the micropores, there may be a short circuit between positive electrode 1 and negative electrode 2. To avoid this, separator 3 preferably has three dimensional micropores which are provided passing through separator 3 from the side of negative electrode active material layer 6 to the side of positive electrode 1 and do not allow the electronically conductive materials to permeate to the opposite side when separator 3 is seen in a plan view. In a case where such a separator having the three dimensional micropores is used, when an electronically conductive material is formed from the side of negative electrode 2 by the thin film forming process, the material particles do not reach the side of positive electrode 1. As a result, no short circuit occurs between positive electrode 1 and negative electrode 2.

From the aforementioned viewpoint, separator 3 used in the present invention is preferably made of a microporous film having micropores, a fine fiber nonwoven cloth, or a material obtained by combining them by heat treatment. Particularly preferred among them is a microporous film having micropores. Microporous films made of a polyolefin material such as polypropylene and polyethylene are further preferred. Separator 3 is also preferably resistant to temperatures of 200° C. or higher by having a heat resistant material on its surface. The micropores have an average diameter of, for example, 0.01 to 0.2 μm, and a maximum diameter of 1 μm or below. Note that these numerical values are only an example and the present invention can be implemented using a separator having other pore diameters.

Considering the ion conduction resistance of separator 3 containing the electrolyte solution, the preferable range of the micropores is 0.04 μm or more and 0.12 μm or less. In other words, separator 3 preferably has a Gurley value of 300 seconds or more and 1500 seconds or less when measured according to JIS P8117. The thickness of separator 3 can be arbitrarily set, and is, for example, 10 to 100 μm. Thus, well-known materials as a separator of the lithium secondary battery can be used.

The following is a description of negative electrode active material layer 6. Negative electrode active material layer 6 is made of a material capable of storing and emitting lithium ions, such as Si, Sn, an oxide thereof, a nitride thereof, or a fluoride thereof. Particularly preferred among them is a Si-containing material because of its high capacity density and its remarkable degree of improvement in durability. Si and Sn are elements having oxidative and nitrative activities, so that they may come into contact with the electrolyte and the like during the manufacture of the battery, and may contain oxides or nitrides. However, the presence of oxides or nitrides in negative electrode active material layer 6 does not affect the negative electrode capacity or durability.

The thin film of negative electrode active material layer 6 formed on separator 3 can have any thickness, but preferably 1 μm to 50 μm, considering the balance with positive electrode 1 and the utilization of the negative electrode active material. The thin-film forming process used to fix negative electrode active material layer 6 on separator 3 is preferably a thin-film forming process generally called a gas-phase process such as deposition, sputtering, spraying, or CVD. Among them, deposition is the most efficient to form negative electrode active material layer 6 with stable properties.

When formed on separator 3 by the thin-film forming process, negative electrode active material layer 6 is formed so as to have island structure as shown in FIGS. 1 and 2. Negative electrode active material layer 6 is in a state where columns are standing on separator 3, and is divided into a plurality of blocks 6B formed in an irregular pattern. These columnar blocks are provided with grooves 9 therebetween formed in an irregular pattern and opened to the side opposite to separator 3. Negative electrode active material layer 6 thus formed like islands can be obtained without being masked with a photoresist; thereby the manufacturing process is simplified. According to the aforementioned manufacturing method, grooves 9 have a width of 10 μm to 100 μm. Blocks 6B which are formed like islands and surrounded by grooves 9 have a maximum diameter of 10 μm to 300 μm, and are in the irregular pattern. Negative electrode active material layer 6 is thus formed so as to have island structure probably due to the strong influence of the surface condition of separator 3 on which the thin film is formed.

Grooves 9 absorb the volume change of negative electrode active material layer 6 caused by its expansion and contraction during the charge-discharge cycles. Consequently, grooves 9 reduce the followings: the stress caused in negative electrode active material layer 6; the destruction of negative electrode active material layer 6; and the peeling off between negative electrode active material layer 6 and metallic current collector layer 7 fixed to each other. This results in an improvement in charge-discharge cycle characteristics when used in a battery.

Blocks 6B of negative electrode active material layer 6 and grooves 9 therebetween can have various shapes depending on the material of separator 3, the conditions of the thin-film forming process, the thickness of the thin film to be formed, and the like. For example, grooves 9 can be completely empty to expose separator 3 on the bottom thereof; a layer connected to adjacent blocks 6B of negative electrode active material layer 6 is formed at the bottom of grooves 9; or negative electrode active material layer 6 is deposited on a part in each of grooves 9. These states have similar effects to reduce the stress of negative electrode active material layer 6.

Figure 3:
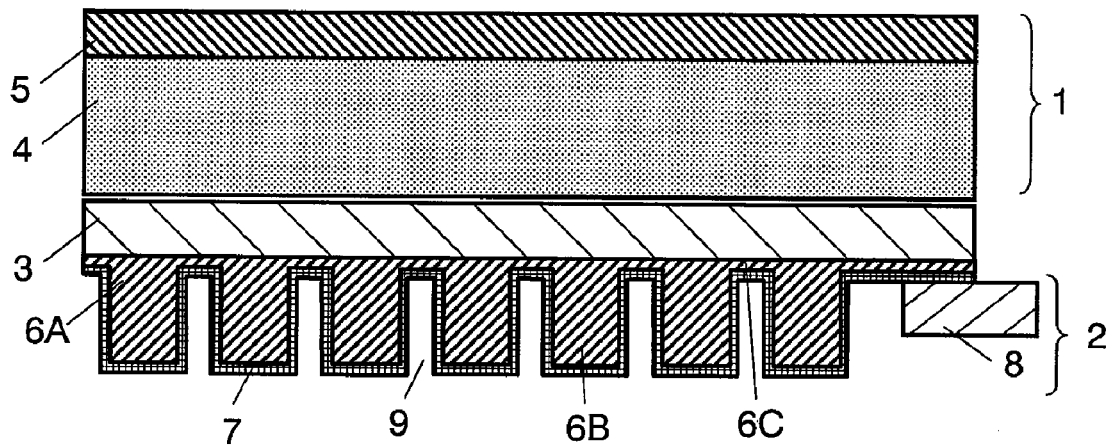
FIG. 3 is a schematic sectional view showing another structure of the secondary battery according to the first exemplary embodiment of the present invention.

Alternatively, as shown in the sectional view of FIG. 3, it is preferable to provide negative electrode active material layer 6A having blocks 6B connected to each other via layer 6C formed in grooves 9. Connecting blocks 6B to each other provides a state in which negative electrode active material layer 6A is entirely brought into conduction as well as through metallic current collector layer 7. The conduction reliability between blocks 6B is thus improved and the internal resistance due to negative electrode active material layer 6A is reduced. As a result, current collection effects are increased. This structure can be obtained by depositing the negative electrode active material in milder conditions than in the formation of the island-like negative electrode active material layer, for example, by setting a lower deposition rate than the state shown in FIG. 2A.

The average thickness of layer 6C formed in grooves 9 is preferably 1/5 or less and more preferably 1/10 or less than the average thickness of blocks 6B. When the average thickness of layer 6C exceeds 1/5, the aforementioned stress-reducing effects are insufficient. In addition, the average thickness of layer 6C is preferably larger than the larger one of 1/100 of the average thickness of blocks 6B and 0.1 µm. When the average thickness of layer 6C is below this, the aforementioned current collection effects cannot be obtained.

It is possible to expand separator 3 in an optional direction after negative electrode active material layer 6 is formed thereon. This can increase the width of grooves 9 without causing the peeling-off of negative electrode active material layer 6. In other words, such expansion can increase the effect of reducing the stress of negative electrode active material layer 6 caused by its expansion and contraction.

A process of forming metallic current collector layer 7 on negative electrode active material layer 6 thus formed is described as follows with reference to FIG. 2B.

Metallic current collector layer 7 is preferably made of a metal such as nickel and copper that is at least hard to form an alloy with lithium. This prevents metallic current collector layer 7 from forming an alloy with lithium so as to have stable properties. In a case where metallic current collector layer 7 is used solely as a current collector, metallic current collector layer 7 is preferably formed contiguously both on negative electrode active material layer 6 and on separator 3 at the bottom of grooves 9 as shown in FIG. 2B.

Metallic current collector layer 7 can be formed by any method, but is preferably formed by a thin film forming process including a gas-phase process such as deposition, sputtering, plasma spraying, and CVD. Especially preferred among them is deposition because it can avoid excessive application of the current collector material and form metallic current collector layer 7 uniformly even on the bottom of grooves 9 of negative electrode active material layer 6.

Metallic current collector layer 7 can have any thickness, and preferably formed thin because both negative electrode active material layer 6 and separator 3 are deformable. Such thin metallic current collector layer 7 can be obtained by the thin film forming process. Therefore, it is unnecessary to use a conventional current collector of 10 µm or thicker, and it is preferable to make the thickness, for example, about 2 µm, which is the level required for current collection. Such a thickness reduction is effective to increase the energy density, packing efficiency, or capacity density of the battery. More specifically, as metallic current collector layer 7 is thinner, it becomes more adaptable to deformation of negative electrode active material layer 6, thereby reducing the peeling-off from negative electrode active material layer 6. However, when metallic current collector layer 7 is too thin, the resistance value is increased to reduce current collection effects. Furthermore, an extremely thin portion of metallic current collector layer 7 may be broken when negative electrode active material layer 6 is expanded. To avoid these problems, the preferable thickness of metallic current collector layer 7 is 1 µm or more and 6 µm or less.

Next, as shown in FIG. 2C, drawing electrode 8 is formed on metallic current collector layer 7. Drawing electrode 8, which is formed as necessary, is preferably made of nickel or copper which is the same as metallic current collector layer 7. Drawing electrode 8 is formed on metallic current collector layer 7 by welding or bonding with a conductive carbon resin. Through these processes as described above, negative electrode 2 is completed.

Next, positive electrode 1 and the electrolyte impregnated into separator 3 are described as follows. Negative electrode active material layer 6 stores lithium ions during charge and emits them during discharge. Therefore, positive electrode active material layer 4 is preferably made of a compound that emits lithium ions during charge and stores them during discharge and that shows a higher reversible potential than lithium. Examples of the material having such characteristics include various lithium-containing composite oxides such as $LiCoO_2$, $LiNiO_2$, and $LiMn_2O_4$.

Positive electrode 1 can be prepared by a thin film forming process such as a gas-phase process in which the material of positive electrode active material layer 4 is directly applied as a thin film to positive electrode current collector 5, which is a conductive substrate. Alternatively, positive electrode 1 can be formed by preparing a slurry mixture containing the aforementioned positive electrode active material, applying it to a current collector made of aluminum foil or the like, and drying it. The mixture is prepared by adding a conductive material such as carbon black, a binder, and an organic solvent such as N-methylpyrrolidone (NMP) and mixing them. Specific examples of the binder include fluoresin such as polyvinylidene fluoride (PVdF), polytetrafluoroethylene (PTFE), and a copolymer of hexafluoropropylene (HFP). Positive electrode 1 can be formed by using positive electrode active materials and electrode manufacturing technology used for conventional lithium batteries.

On the other hand, the electrolyte impregnated into separator 3 can be selected from a lot of electrolytes used in general lithium secondary batteries. These electrolytes are formed by combining a lithium-containing electrolyte with various non-aqueous solvents such as γ-butyrolactone, tetrahydrofuran, propylene carbonate (PC), ethylene carbonate (EC), and ethyl methyl carbonate. The most preferable one is a non-aqueous electrolyte solution obtained by dissolving $LiPF_6$ as the electrolyte in a mixture solvent of EC and PC in a volume ratio of 1:1.

The aforementioned structure can achieve a secondary battery improved in cell performance and durability to charge-discharge cycles by using the negative electrode active material having a high capacity density.

Second Exemplary Embodiment

Figure 4:
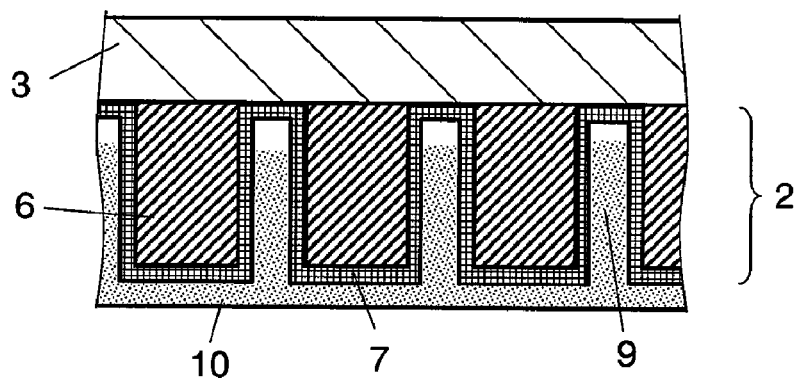
FIG. 4 is a schematic sectional view showing a structure of a negative electrode for a secondary battery according to a second exemplary embodiment of the present invention.

The following is a description of a case where the current collector layer of negative electrode 2 is a combination of metallic current collector layer 7 made of copper or nickel and carbon current collector layer 10. FIG. 4 is a schematic sectional view showing a structure of negative electrode 2 of a secondary battery according to a second exemplary embodiment of the present invention.

In the same manner as in the first exemplary embodiment, metallic current collector layer 7 is formed both on negative electrode active material layer 6 on separator 3 and on the bottom of grooves 9. In the present exemplary embodiment, there is also provided carbon current collector layer 10 on metallic current collector layer 7 and in grooves 9. In other words, the current collector layer of the present exemplary embodiment is formed of metallic current collector layer 7 and carbon current collector layer 10.

Metallic current collector layer 7 is formed on negative electrode active material layer 6 and on separator 3 at the bottom of grooves 9 including the inside of grooves 9, and functions to collect current from negative electrode active material layer 6. On the other hand, carbon current collector layer 10 coats the earlier-formed metallic current collector layer 7 and supports the current-collecting function of metallic current collector layer 7. Grooves 9 having metallic current collector layer 7 on their wall surfaces is filled with part of carbon current collector layer 10 in order to reduce the stress of negative electrode active material layer 6 as well as to support the current collection performance. The part of carbon current collector layer 10 can function to maintain the shape of negative electrode active material layer 6. Even when metallic current collector layer 7 is broken by the stress of negative electrode active material layer 6, the part of carbon current collector layer 10 can help the stable electron transfer between negative electrode active material layer 6 and metallic current collector layer 7.

Carbon current collector layer 10 can be formed by a thin film forming process as similar to metallic current collector layer 7. The formed thin film is a porous thin film formed of laminated carbon particles.

In FIG. 4, grooves 9 are not entirely filled with carbon current collector layer 10. This structure is advantageous when the expansion of negative electrode active material layer 6 is large because it ensures the space for the expansion. On the other hand, it is preferred that grooves 9 are completely filled with carbon current collector layer 10 in order to ensure conductivity. In this manner, grooves 9 only have to contain carbon current collector layer 10 and may or may not be completely filled with carbon current collector layer 10 depending on the degree of expansion of negative electrode active material layer 6.

In the first and second exemplary embodiments, the lithium ions can enter negative electrode active material layer 6 only through the portion where negative electrode active material layer 6 is fixed to separator 3 because metallic current collector layer 7 covers the columnar side surfaces of the negative electrode active material.

Third Exemplary Embodiment

Figure 5:
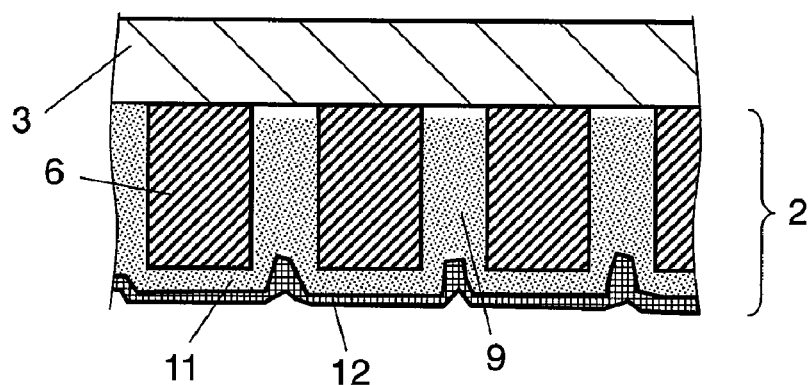
FIG. 5 is a schematic sectional view showing a structure of a negative electrode for a secondary battery according to a third exemplary embodiment of the present invention.

FIG. 5 is a schematic sectional view showing a structure of a negative electrode for a secondary battery according to a third exemplary embodiment of the present invention. The negative electrode with this structure differs from the negative electrode of the second exemplary embodiment in that carbon current collector layer 11 is formed on negative electrode active material layer 6 and metallic current collector layer 12 is further formed thereon. In other words, negative electrode active material layer 6 is formed on separator 3, and carbon current collector layer 11 is formed so as to cover negative electrode active material layer 6 and fill grooves 9. Then, metallic current collector layer 12 is formed on carbon current collector layer 11. Thus, the same as in the second exemplary embodiment, the current collector layer of the present exemplary embodiment is formed of metallic current collector layer 7 and carbon current collector layer 11.

In this structure, carbon current collector layer 11, which is interposed between negative electrode active material layer 6 and metallic current collector layer 12, functions to transfer electrons therebetween. As carbon current collector layer 11 is a porous thin film, negative electrode active material layer 6 and metallic current collector layer 12 are in a weakly bonded state. However, even when negative electrode active material layer 6 is deformed due to expansion and contraction, carbon current collector layer 11 slides to reduce the stress of negative electrode active material layer 6, thereby keeping a good contact state between carbon current collector layer 11 and negative electrode active material layer 6. Additionally, carbon current collector layer 11 can perform stable electron transfer with metallic current collector layer 12, thereby improving cell performance.

Since carbon current collector layer 11 is a porous body, in a condition where carbon current collector layer 11 is thickly deposited in grooves 9, the lithium ions from positive electrode 1 can enter not only through the portion where negative electrode active material layer 6 and separator 3 are bonded to each other, but also through the wall surfaces inside grooves 9. As a result, excellent high rate discharge characteristics can be obtained. Carbon current collector layer 11 applied in grooves 9 not only reduces the deforming stress of negative electrode active material layer 6 but also supports the shape of negative electrode active material layer 6. Furthermore, in the same manner as in the second exemplary embodiment, even if metallic current collector layer 12 is broken by the stress of negative electrode active material layer 6, carbon current collector layer 11 can help the stable electron transfer between negative electrode active material layer 6 and metallic current collector layer 12.

In FIG. 5, grooves 9 are not completely filled with carbon current collector layer 11. This structure is advantageous when the expansion of negative electrode active material layer 6 is large because it ensures the space for the expansion. On the other hand, it is preferred that grooves 9 are completely filled with carbon current collector layer 11 in order to ensure conductivity. In this manner, grooves 9 only have to contain carbon current collector layer 10 and may or may not be completely filled with carbon current collector layer 10 depending on the degree of expansion of negative electrode active material layer 6.

Hereinafter, the first to third exemplary embodiments of the present invention are described in specific examples. Note that the present invention is not limited to these examples.

EXAMPLE 1

Batteries of Example 1 are manufactured in accordance with the first exemplary embodiment as follows. As separator 3, is used a microporous film having a polyethylene resin layer and polypropylene resin layers on both sides of the polyethylene resin layer. The polyethylene resin layer is 8 μm-thick and resistant to temperatures of 150° C., and each of the polypropylene resin layers is 8 μm-thick and resistant to temperatures of 180° C. Separator 3 is provided on a side thereof with a Si thin film layer as negative electrode active material layer 6. Negative electrode active material layer 6 is formed on separator 3 by deposition as follows. First, Si placed as a deposition source material in vacuum equipment is exposed to 4 kW electron beam so as to be heated and melted, thereby their depositing particles are deposited on separator 3 used as a substrate. The pressure in the vacuum equipment during deposition is set to 0.005 Pa and the deposition is performed for eight minutes. Under such conditions of the thin film forming process, the negative electrode active material is deposited on separator 3. As a result, a thin film of negative electrode active material layer 6 in an irregular pattern is obtained so as to have a thickness of 10 μm and columns of 50 μm to 200 μm, and grooves 9 with an average width of 30 μm opened to the opposite side of separator 3. In addition, one end of negative electrode active material layer 6 is fixed to separator 3.

Next, a copper thin film as metallic current collector layer 7 is formed by deposition. An electron beam with 6 kW is used as a deposition heat source, the pressure in the vacuum equipment is set to 0.005 Pa, and the deposition is performed for four minutes. Under such conditions, negative electrode 2 is obtained so as to have metallic current collector layer 7 with an average thickness of 2 μm. In negative electrode 2, metallic current collector layer 7 has copper drawing electrode 8 attached to one end thereof.

Negative electrode 2 thus prepared is opposed to positive electrode 1 having lithium cobalt oxide ($LiCoO_2$) as the positive electrode active material with separator 3 interposed therebetween, and placed in a case (unillustrated) made of an aluminum laminated film. The case is filled with an electrolyte so as to impregnate separator 3 with it, thereby completing one of the secondary batteries.

Positive electrode 1 is prepared as follows. First, 100 parts by weight of $LiCoO_2$ with an average particle diameter of 5 μm is mixed with 3 parts by weight of acetylene black as a conductive agent. The resultant mixture is mixed with 4 parts by weight (in terms of PVdF weight ratio) of an NMP solution of PVdF as a binder, and kneaded. The positive electrode mixture paste thus obtained is applied to a side of positive electrode current collector 5 made of aluminum foil, dried and roll-pressed so as to complete positive electrode 1. The electrolyte is a non-aqueous electrolyte solution prepared by dissolving $LiPF_6$ at a concentration of 1 $mol/dm^3$ in a mixture solvent of EC and PC in a volume ratio of 1:1.

EXAMPLE 2

Negative electrode 2 of Example 2 is manufactured in accordance with the second exemplary embodiment as follows.

First, metallic current collector layer 7 made of copper is formed on negative electrode active material layer 6 which is fixed on separator 3, and then carbon current collector layer 10 is formed on metallic current collector layer 7. Batteries of Example 2 are manufactured in the same manner as those of Example 1 in the other aspects. Carbon current collector layer 10 is formed by deposition using electron beam heating in the same manner as in the formation of metallic current collector layer 7. As a deposition source material, carbon shaped in cylindrical form is used. The thickness of the carbon current collector layer 10 is set to about 2 μm both in the region of forming the negative electrode active material and in the grooves.

EXAMPLE 3

Negative electrode 2 of Example 3 is manufactured in accordance with the third exemplary embodiment as follows. First, carbon current collector layer 11 is formed on negative electrode active material layer 6 which is fixed on separator 3, and then metallic current collector layer 12 is formed on carbon current collector layer 11. Batteries of Example 3 are manufactured in the same manner as those of Example 2 in the other aspects. The thickness of the carbon current collector layer 11 is set to about 2 μm both in the region of forming the negative electrode active material and in the grooves.

EXAMPLE 4

Negative electrode 2 of Example 4 is prepared as follows. After negative electrode active material layer 6 is formed on separator 3, separator 3 is expanded by 10% in the left-right directions. Then, metallic current collector layer 7 is formed thereon. Batteries of Example 4 are manufactured in the same manner as those of Example 1 in the other aspects.

Figure 6B:
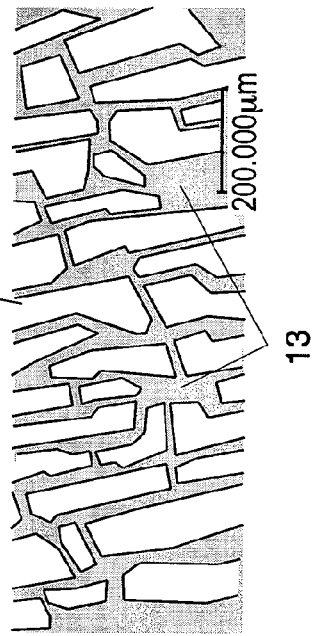
FIG. 6B is a schematic diagram showing a planar structure of the optical microscope image of FIG. 6A.
Figure 7B:
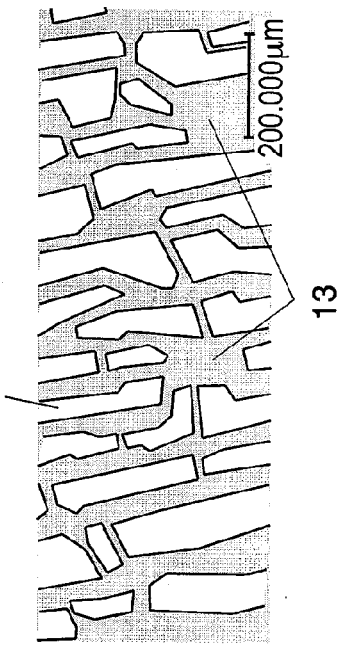
FIG. 7B is a schematic diagram showing a planar structure of the optical microscope image of FIG. 7A.
Figure 6A:
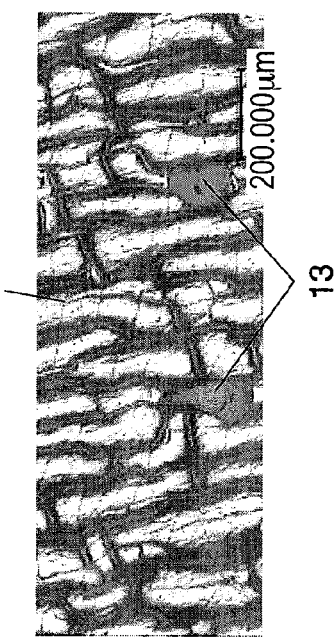
FIG. 6A shows an optical microscope image of Example 1 according to the exemplary embodiments of the present invention.
Figure 7A:
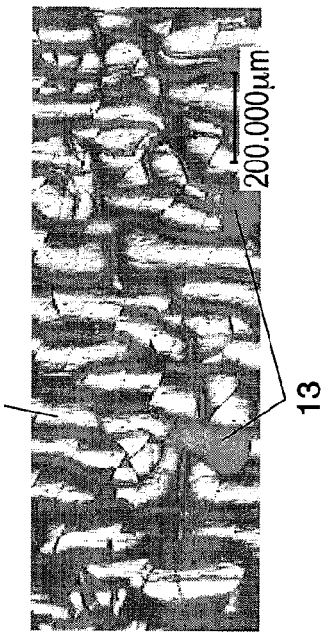
FIG. 7A shows an optical microscope image of Example 4 according to the exemplary embodiments of the present invention.

The surface condition of negative electrode 2 used in Example 1 is shown in FIGS. 6A and 6B. The surface condition of negative electrode 2 used in Example 4 is shown in FIGS. 7A and 7B. FIGS. 6A and 7A are optical microscope images, and FIGS. 6B and 7B are their schematic diagrams. The images and diagrams indicate that defective portions 13 of blocks 6B in Example 4 have a larger spacing therebetween than in Example 1. It is also revealed that blocks 6B have a larger spacing therebetween.

COMPARATIVE EXAMPLE

Figure 8:
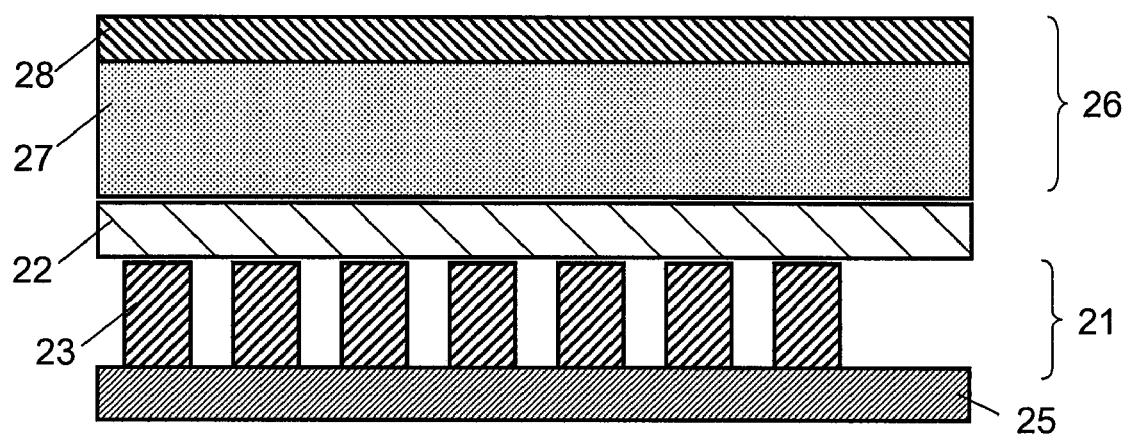
FIG. 8 is a schematic sectional view showing a structure of a secondary battery of Comparative Example.

Secondary batteries having the structure shown in FIG. 8 are manufactured as Comparative Example. Negative electrode 21 is formed of negative electrode current collector 25 and negative electrode active material layer 23 formed in a pattern on negative electrode current collector 25. Positive electrode 26 is formed of positive electrode active material layer 27 and positive electrode current collector 28.

Negative electrode active material layer 23 of Comparative Example is prepared as follows. First, Si is deposited on a 5 μm-thick copper substrate used as negative electrode current collector 25 using a photoresist mask, thereby preparing negative electrode active material layer 23. Later, the resist is removed from negative electrode current collector 25, and negative electrode active material layer 23 having a columnar structure is patterned. The columnar structure is formed of a plurality of 100 μm square columns with 30 μm-wide grooves therebetween.

Negative electrode 21 is combined with separator 22 and positive electrode 26, which are structured in the same manner, respectively, as separator 3 and positive electrode 1 of Example 1. Negative electrode 21 and positive electrode 26 are disposed opposite to each other in such a manner that negative electrode active material layer 23 and separator 22 are in contact with each other, and placed in a case (unillustrated) made of an aluminum laminated film. Then, the case is filled with the same non-aqueous electrolyte solution as used in Example 1, thereby non-aqueous electrolyte secondary batteries are completed.

The sample batteries thus manufactured are evaluated as follows. The non-aqueous electrolyte secondary batteries of Examples 1 to 4 and Comparative Example are evaluated for charge-discharge cycle characteristics. The charge-discharge cycle characteristics represent battery durability evaluated by placing these batteries in environmental test equipment at 20° C. and repeatedly charging and discharging them at a current of 0.1 CA in the range of 4.2V to 2.5V. The cycle number when the discharge capacity falls below 50% of the initial capacity during the charge-discharge cycles is determined as the life of the batteries. Note that 0.1 CA indicates a current value to discharge the design capacity in 10 hours. The battery configuration overview and the cycle numbers with respect to discharge capacity deterioration are shown in Table 1.

TABLE 1

| | negative electrode active material layer | | current collector layer | | life (cycle) |
|---|---|---|---|---|---|
| | formation | thickness (μm) | material | thickness (μm) | |
| Example 1 | fixed to separator | 10 | copper | 2 | 80 |
| Example 2 | fixed to separator | 10 | copper carbon | 2 2 | 140 |
| Example 3 | fixed to separator | 10 | carbon copper | 2 2 | 140 |
| Example 4 | fixed to separator and expanded | 10 | copper | 2 | 150 |
| Comparative Example | fixed to metal substrate | 10 | copper substrate | 5 | 30 |

In Comparative Example, negative electrode current collector 25 is made of a copper substrate having a thickness of 5 μm, which is the minimum thickness required to be handled. In Examples 1 to 4, on the other hand, the current collector consists of metallic current collector layer 7 or metallic current collector layer 7 and carbon current collector layer 10 each having a thickness of 2 μm. Thus, the present invention can reduce the entire thickness of the current collector layer. Considering that these batteries have similar discharge capacity, the capacity density of negative electrode 2 is higher by 36% in Examples 1 and 4 and by 20% in Examples 2 and 3 than in Comparative Example.

In the durability test to evaluate the charge-discharge cycle characteristics, 50% or more of the initial capacity is obtained during 30 cycles in Comparative Example. In contrast, 50% or more of the initial capacity is obtained during 80 cycles in Example 1, 140 cycles in Examples 2 and 3, and 150 cycles in Example 4. Thus, all of Examples 1 to 4 show durability more than twice better than Comparative Example. Some of the batteries of each of Examples 1 to 4 and Comparative Example are decomposed after 30 cycles for examination. As a result, in Comparative Example, the negative electrode active material is often observed to be broken and also peeled off from current collector 25. In contrast, in Examples 1 to 4, negative electrode active material layer 6 is observed to be hardly broken and kept in an electrical contact with the current collector layer in almost all the region.

In Comparative Example, negative electrode active material layer 23 having a columnar structure are patterned so that the columns are arranged with spaces therebetween similar to Examples 1 to 4. However, negative electrode active material layer 23 is observed to be damaged by the volume change and stress due to charge-discharge cycles or to be peeled off from current collector 25. This is because negative electrode active material layer 23 is fixed to current collector 25 having a low flexibility.

In Examples 1 to 4, in contrast, negative electrode active material layer 6 fixed to separator 3 having flexibility is used as a base. This allows separator 3 to highly support the negative electrode active material. Furthermore, the current collector layer, which is formed in a thin film, can be adaptable to the expansion and contraction of negative electrode active material layer 6. In addition, carbon current collector layers 10 and 11 and grooves 9 absorb the volume change of negative electrode active material layer 6. It is likely that these advantages cooperatively produce the effect of reducing the stress of the negative electrode active material.

In the exemplary embodiments of the present invention, the reduction in the thickness of the current collector layer produces geometric effects to increase the capacity density of negative electrode 2. In addition, it becomes possible to use a metal such as Si or Sn, an oxide thereof, a nitride thereof, or a fluoride thereof as an active material which can store and emit a large amount of lithium ions theoretically but expand and contract greatly due to charge-discharge cycles.

INDUSTRIAL APPLICABILITY

The non-aqueous electrolyte secondary battery of the present invention provides a new approach to improve the energy density of lithium secondary batteries, and is therefore useful not only to the battery industry but also to miniature equipment powered by lithium batteries.

The invention claimed is:

1. A negative electrode for a lithium secondary battery comprising:
   a separator;
   a negative electrode active material layer fixed to the separator, the negative electrode active material layer being capable of storing and emitting lithium ions and containing at least one selected from a group consisting of silicon, silicon alloys, compounds containing silicon and oxygen, compounds containing silicon and nitrogen, compounds containing silicon and fluorine, tin, tin alloys, compounds containing tin and oxygen, compounds containing tin and nitrogen, and compounds containing tin and fluorine; and
   a current collector layer formed on a side of the negative electrode active material layer, the side opposite to the separator, wherein
   the negative electrode active material layer is provided with a groove opened to a side opposite to the separator; and
   the groove has a wall surface and the current collector layer is on the wall surface.

2. The negative electrode for a lithium secondary battery according to claim 1, wherein
   the current collector layer includes a metallic current collector layer containing at least one of copper and nickel.

3. The negative electrode for a lithium secondary battery according to claim 2, wherein
   the current collector layer includes a carbon current collector layer containing carbon.

4. The negative electrode for a lithium secondary battery according to claim 3, wherein
   the metallic current collector layer is formed on the negative electrode active material layer; and
   the carbon current collector layer is formed on the metallic current collector layer.

5. The negative electrode for a lithium secondary battery according to claim 3, wherein
   the carbon current collector layer is formed on the negative electrode active material layer; and
   the metallic current collector layer is formed on the carbon current collector layer.

6. The negative electrode for a lithium secondary battery according to claim 1, wherein the separator is a microporous film provided with micropores.

7. The negative electrode for a lithium secondary battery according to claim 1, wherein the separator has a heat resistance layer resistant to temperatures of at lowest 200° C. on a side thereof, the side having the negative electrode active material fixed thereto.

8. A lithium secondary battery comprising:
   the negative electrode for a lithium secondary battery according to claim 1;
   a positive electrode capable of reversibly storing and emitting lithium ions; and
   an electrolyte contained at least in the separator, the electrolyte capable of conducting lithium ions.

9. A method for manufacturing a negative electrode for a lithium secondary battery comprising:
   A) forming a negative electrode active material layer on a separator by a gas-phase process so as to have island structure and to provide a groove opened to a side opposite to the separator, the groove having a wall surface, the negative electrode active material layer being capable of storing and emitting lithium ions and containing at least one selected from a group consisting of silicon, silicon alloys, compounds containing silicon and oxygen, compounds containing silicon and nitrogen, compounds containing silicon and fluorine, tin, tin alloys, compounds containing tin and oxygen, compounds containing tin and nitrogen, and compounds containing tin and fluorine; and
   B) forming a current collector layer on the negative electrode active material layer, including on the wall surface of the groove, by a gas-phase process.

10. The method for manufacturing a negative electrode for a lithium secondary battery according to claim 9, wherein
   at least one of a metallic current collector layer containing at least one of copper and nickel, and a carbon current collector layer containing carbon is formed in Step B.

11. The method for manufacturing a negative electrode for a lithium secondary battery according to claim 9, further comprising:
   expanding the separator after Step A.

12. A method for manufacturing a lithium secondary battery comprising:
   A) forming a negative electrode active material layer on a separator by a gas-phase process so as to have island structure and to provide a groove opened to a side opposite to the separator, the groove having a wall surface, the negative electrode active material layer being capable of storing and emitting lithium ions and containing at least one selected from a group consisting of silicon, silicon alloys, compounds containing silicon and oxygen, compounds containing silicon and nitrogen, compounds containing silicon and fluorine, tin, tin alloys, compounds containing tin and oxygen, compounds containing tin and nitrogen, and compounds containing tin and fluorine;
   B) forming a current collector layer on the negative electrode active material layer, including on the wall surface of the groove, by a gas-phase process;
   C) providing a positive electrode on a side of the separator opposite to the negative electrode active material layer, the positive electrode being capable of storing and emitting lithium ions; and
   D) impregnating at least the separator with an electrolyte having a lithium-ion conductivity.

13. The method for manufacturing a lithium secondary battery according to claim 12, wherein
   at least one of a metallic current collector layer containing at least one of copper and nickel, and a carbon current collector layer containing carbon is formed in Step B.

14. The method for manufacturing a lithium secondary battery according to claim 12, further comprising:
   expanding the separator after Step A.

15. The method for manufacturing a negative electrode for a lithium secondary battery according to claim 10, further comprising:
   expanding the separator after Step A.

16. The method for manufacturing a lithium secondary battery according to claim 13, further comprising:
   expanding the separator after Step A.

* * * * *